(12) United States Patent
Dos Santos, Jr.

(10) Patent No.: US 8,583,682 B2
(45) Date of Patent: Nov. 12, 2013

(54) PEER-TO-PEER WEB SEARCH USING TAGGED RESOURCES

(75) Inventor: Edson G. Dos Santos, Jr., Renton, WA (US)

(73) Assignee: Microsoft Corporation, Redmond, WA (US)

( * ) Notice: Subject to any disclaimer, the term of this patent is extended or adjusted under 35 U.S.C. 154(b) by 368 days.

(21) Appl. No.: 12/346,438

(22) Filed: Dec. 30, 2008

(65) Prior Publication Data

US 2010/0169334 A1 Jul. 1, 2010

(51) Int. Cl.
*G06F 17/30* (2006.01)
(52) U.S. Cl.
USPC .................. 707/770; 707/E17.114; 709/218
(58) Field of Classification Search
CPC .................. G06F 17/30864; G06F 17/30067; G06Q 30/02
USPC ............. 707/999.003, 705, 758, 999.01, 770, 707/E17.114; 709/218
See application file for complete search history.

(56) References Cited

U.S. PATENT DOCUMENTS

| | | | | |
|---|---|---|---|---|
| 6,314,423 B1* | 11/2001 | Himmel et al. | | 1/1 |
| 6,324,566 B1* | 11/2001 | Himmel et al. | | 709/203 |
| 6,334,124 B1* | 12/2001 | Bouchard et al. | | 1/1 |
| 6,374,289 B2* | 4/2002 | Delaney et al. | | 709/203 |
| 6,460,060 B1* | 10/2002 | Maddalozzo et al. | | 715/234 |
| 6,480,853 B1* | 11/2002 | Jain | | 1/1 |
| 7,162,473 B2 | 1/2007 | Dumais | | |
| 7,565,405 B2* | 7/2009 | Grosse et al. | | 709/214 |
| 7,624,337 B2* | 11/2009 | Sull et al. | | 715/201 |
| 7,627,598 B1* | 12/2009 | Burke | | 1/1 |
| 7,685,224 B2* | 3/2010 | Nye | | 709/201 |
| 7,707,147 B2* | 4/2010 | Steels et al. | | 707/713 |
| 7,783,749 B2* | 8/2010 | Hopkins | | 709/224 |
| 7,818,336 B1* | 10/2010 | Amidon et al. | | 707/769 |
| 7,849,139 B2* | 12/2010 | Wolfson et al. | | 709/205 |
| 7,933,972 B1* | 4/2011 | Issa et al. | | 709/219 |
| 7,953,731 B2* | 5/2011 | Patel et al. | | 707/723 |
| 7,991,764 B2* | 8/2011 | Rathod | | 707/713 |

(Continued)

OTHER PUBLICATIONS

Ribeiro et al., "Implementing a Peer-to-Peer Browser for Publishing and Searching Web Pages on Internet", IEEE, International Conference on Advanced Networking and Applications 2007, 8 pages.*

(Continued)

*Primary Examiner* — Phuong Thao Cao
(74) *Attorney, Agent, or Firm* — Shook Hardy & Bacon LLP

(57) ABSTRACT

Systems and methods for conducting peer-to-peer (PTP) Internet searches utilizing tagged web resources, that is, web resources that the local user and/or a user at an associated remote computing device has tagged as evidence of a desire to have that resource as part of a PTP search community of resources, are provided. A user's search query is received and local and/or remote client computers associated with the user are searched directly for stored web resource links corresponding to the user's search query. Links to web resources that are identified by the search as corresponding to (i.e., satisfying) the user's search query are presented to the user. The user may then review the presented web resource links and determine if he or she would like to tag the web resource and add it to his or her local list of resources as part of the foundation for future PTP community searches.

16 Claims, 5 Drawing Sheets

(56) References Cited

U.S. PATENT DOCUMENTS

| | | | |
|---|---|---|---|
| 8,086,629 B2* | 12/2011 | Terao et al. | 707/770 |
| 8,095,500 B2* | 1/2012 | Rose et al. | 707/609 |
| 2002/0073075 A1* | 6/2002 | Dutta et al. | 707/3 |
| 2002/0081970 A1* | 6/2002 | Wingren | 455/41 |
| 2002/0178223 A1* | 11/2002 | Bushkin | 709/205 |
| 2003/0018621 A1* | 1/2003 | Steiner et al. | 707/3 |
| 2003/0041054 A1* | 2/2003 | Mao et al. | 707/3 |
| 2003/0065774 A1* | 4/2003 | Steiner et al. | 709/225 |
| 2003/0084034 A1* | 5/2003 | Fannin | 707/3 |
| 2004/0024877 A1* | 2/2004 | Celle | 709/226 |
| 2004/0193919 A1* | 9/2004 | Dabbish et al. | 713/201 |
| 2004/0243559 A1 | 12/2004 | Brundege | |
| 2004/0267815 A1* | 12/2004 | De Mes | 707/104.1 |
| 2005/0050028 A1* | 3/2005 | Rose et al. | 707/3 |
| 2005/0108203 A1* | 5/2005 | Tang et al. | 707/3 |
| 2005/0149500 A1* | 7/2005 | Marmaros et al. | 707/3 |
| 2005/0198061 A1* | 9/2005 | Robinson et al. | 707/102 |
| 2006/0004739 A1* | 1/2006 | Anthony et al. | 707/4 |
| 2006/0020904 A1* | 1/2006 | Aaltonen et al. | 715/850 |
| 2006/0074906 A1* | 4/2006 | Steels et al. | 707/5 |
| 2006/0107297 A1* | 5/2006 | Toyama et al. | 725/105 |
| 2006/0143466 A1* | 6/2006 | Muller et al. | 713/182 |
| 2006/0190427 A1* | 8/2006 | Peters et al. | 707/3 |
| 2006/0195462 A1* | 8/2006 | Rogers | 707/100 |
| 2006/0277210 A1* | 12/2006 | Starbuck | 707/102 |
| 2007/0011095 A1* | 1/2007 | Vilcauskas et al. | 705/51 |
| 2007/0011145 A1* | 1/2007 | Snyder | 707/3 |
| 2007/0033569 A1* | 2/2007 | Davidson et al. | 717/103 |
| 2007/0043720 A1* | 2/2007 | Koenig et al. | 707/6 |
| 2007/0156636 A1* | 7/2007 | Norton et al. | 707/1 |
| 2007/0266446 A1* | 11/2007 | Aaron | 726/30 |
| 2008/0021872 A1* | 1/2008 | Borrillo et al. | 707/3 |
| 2008/0040313 A1* | 2/2008 | Schachter | 707/2 |
| 2008/0114573 A1* | 5/2008 | Hsieh et al. | 703/2 |
| 2008/0114739 A1* | 5/2008 | Hayes | 707/3 |
| 2008/0141126 A1* | 6/2008 | Johnson et al. | 715/273 |
| 2008/0172399 A1* | 7/2008 | Chi et al. | 707/100 |
| 2008/0172472 A1* | 7/2008 | Goodman et al. | 709/208 |
| 2008/0183680 A1* | 7/2008 | Meynier et al. | 707/3 |
| 2008/0195597 A1* | 8/2008 | Rosenfeld et al. | 707/5 |
| 2008/0215553 A1* | 9/2008 | Badros et al. | 707/3 |
| 2008/0215583 A1* | 9/2008 | Gunawardena et al. | 707/7 |
| 2008/0244038 A1* | 10/2008 | Martinez | 709/218 |
| 2008/0254434 A1* | 10/2008 | Calvert | 434/350 |
| 2008/0263030 A1* | 10/2008 | George et al. | 707/5 |
| 2009/0012940 A1* | 1/2009 | Ives et al. | 707/3 |
| 2009/0083278 A1* | 3/2009 | Zhao et al. | 707/10 |
| 2009/0171894 A1* | 7/2009 | Schachter | 707/3 |
| 2009/0171898 A1* | 7/2009 | Prager et al. | 707/3 |
| 2009/0254977 A1* | 10/2009 | Ghanea-Hercock | 726/4 |
| 2009/0271690 A1* | 10/2009 | Iglesias | 715/200 |
| 2009/0307198 A1* | 12/2009 | Zhang et al. | 707/4 |
| 2009/0327277 A1* | 12/2009 | Sanborn et al. | 707/5 |
| 2010/0030752 A1* | 2/2010 | Goldentouch | 707/3 |
| 2010/0037161 A1* | 2/2010 | Stading et al. | 715/764 |
| 2010/0250674 A1* | 9/2010 | Terao et al. | 709/204 |

OTHER PUBLICATIONS

Lee et al., "Efficient Content Search in iShare, a P2P based Internet-Sharing System", IEEE International Symposium on Parallel and Distributed Processing, Apr. 14-18, 2008, 8 pages.*

Vishnevsky et al., "Tag Routing for Efficient Blind Search in Peer-to-Peer Networks", Proceedings of the 11th IEEE Symposium on Computers and Communications, 2006, 8 pages.*

Li et al., "Searching Techniques in Peer-to-Peer Networks", in handbook of Theoretical and Algorithmic Aspects of Ad Hoc, Sensor, and Peer-to-Peer Networks, Auerbach, New York, USA, 2006, 31 pages.*

Bender et al., "Bookmark-driven Query Routing in Peer-to-Peer Web Search", In Proceedings of the SIGIR Workshop on P2P-IR, 2004, 12 pages.*

Weikum et al., "Towards Self-Organizing Query Routing and Processing for Peer-to-Peer Web Search", In Proceedings of the European Conference on Complex Systems (ECCS 2005), Paris, France, Nov. 14, 2005, 19 pages.*

Kaasten et al., "Integrating Back, History and Bookmarks in Web Browsers", Short Talks, CHI 2001, Mar. 31-Apr. 5, 2001, pp. 379-380.*

Client Search 1.4 http://www.freedownloadscenter.com/Web_Authoring/CGI_Programming_Tools/Client_Search.html.

Client-side Web Mining for Community Formation in Peer-to-Peer Environments http://www.sigkdd.org/explorations/issues/8-2-2006-12/2-WebKdd.pdf.

Chapter 1 The Client-Side Search Engine http://oreilly.com/catalog/jscook/chapter/ch01.html.

Web Search Personalization via Social Bookmarking and Tagging http://iswc2007.semanticweb.org/papers/365.pdf.

P2P Web Search: Make It Light, Make It Fly http://lsirpeople.epfl.ch/smichel/publications/cidr2007.pdf.

* cited by examiner

PEER-TO-PEER WEB SEARCH USING TAGGED RESOURCES

BACKGROUND

The Internet allows users access to large quantities of information. Information is stored on individual web resources (e.g., websites, web pages, Uniform Resource Locators (URLs), Uniform Resource Identifiers (URIs), and the like) and is generally located through the use of search engines. Typically, an Internet search is performed through a client/server search engine. A user enters search terms at a client computer, and the search is conducted by a server computer. Such a client/server search system requires vast resources to implement (server infrastructure) and maintain (data mining).

SUMMARY

Embodiments of the present invention relate to systems and methods for conducting peer-to-peer (PTP) Internet searches utilizing tagged web resources, that is, web resources (e.g., websites, web pages, Uniform Resource Locators (URLs), Uniform Resource Identifiers (URIs), and the like) that the local user and/or a user at an associated remote computing device has tagged as evidence of a desire to have that resource as part of a PTP search community of resources. Using the systems and methods described herein, a user's search query is received and local and/or remote client computers associated with the user are searched directly for stored web resource links corresponding to the user's search query. Links to web resources that are identified by the search as corresponding to (i.e., satisfying) the user's search query are presented to the user. The user may then review the presented web resource links and determine if he or she would like to tag the web resource and add it to his or her local list of resources as part of the foundation for future PTP community searches. If the user does not desire to tag any of the presented web resources links, he or she may discard the presented links as irrelevant, thus ending the search cycle.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention is described in detail below with reference to the attached drawing figures, wherein.

DETAILED DESCRIPTION

Figure 1:
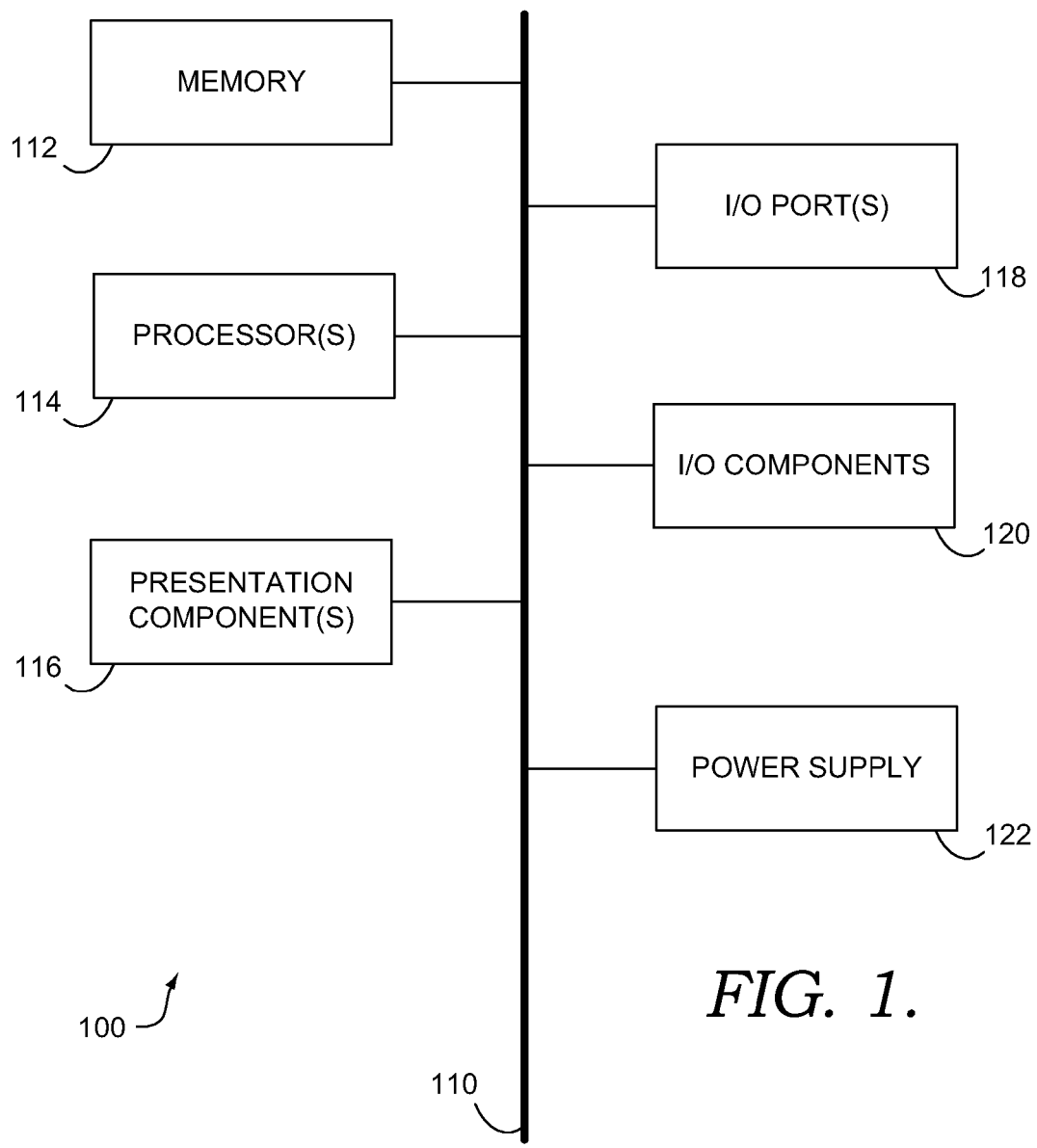
FIG. 1 is a block diagram of an exemplary computing environment suitable for use in implementing embodiments of the present invention.

Embodiments of the present invention are described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention provide systems and methods for conducting peer-to-peer (PTP) Internet searches utilizing tagged web resources, that is, web resources that the local user and/or a user at an associated remote computing device has tagged as evidence of a desire to have that resource as part of the PTP search community of resources. Using the systems and methods described herein, a user's search query is received and rather than (or in addition to) a server crawling the Internet for web resources corresponding to the received search query, local and/or remote client computing devices associated with the user are searched directly for stored web resource links corresponding to the user's search query. Links to web resources that are identified by the search as corresponding to (i.e., satisfying) the user's search query are presented to the user, for instance, in a list format. The user may then review the presented web resource links. If the user determines that one or more of the presented web resource links contains useful or desirable information, the user may tag the useful link(s) (for instance, with appropriate keywords) and add the link(s) to a local list of approved web resource links. If the user does not desire to tag any of the presented web resources links, he or she may discard the presented links as irrelevant, thus ending the search cycle. Over time, each user's local list becomes increasingly populated, forming the basis for future searches. Individual users may also populate their local lists by tagging and adding web resource links encountered while browsing the Internet through conventional means.

Remote client computers may be either "trusted" or "unknown." Trusted client computers may be designated as trusted by a particular user and/or may be defined as trusted by other sources (for instance, indicated as a trusted remote client computer of another remote client computer that has been indicated as trusted by the particular user) and accessed by the particular user. Unknown remote client computers are client computers that a particular user has not approved and designated as trusted. The number of unknown remote client computers searched in response to a particular keyword query may be limited to only those computers within a certain number of router hops of the user's client computer.

In one embodiment, the present invention provides a computer-implemented method for conducting a peer-to-peer Internet search. The method includes receiving a search request input by a user and searching one or more client computing devices to determine if at least one web resource associated with a web resource link stored in association therewith corresponds to the received search request, wherein at least one of the one or more client computing devices is associated with the user. Upon determining that at least one web resource associated with a web resource link corresponds to the received search request, the method further includes storing the at least one web resource link. A list of stored web resource links corresponding to the received search request is generated and presented to the user. The method further includes receiving a user selection and user tagging of at least one web resource link presented in association with the list and storing the at least one user-selected and user-tagged web resource link in association with at least one of the one or more client computing devices associated with the user.

In another embodiment, the present invention provides a computing system for performing a method for conducting a peer-to-peer Internet search, the computer system comprising a processor coupled to a computer-storage medium, the computer-storage medium having stored thereon a plurality of computer software components executable by the processor. The computer software components include a search request receiving component for receiving a search request from a user, a search component for searching one or more client computing devices for web resource links associated with web resources corresponding to the received search request, a list generation component for generating a list of the web resource links associated with web resources corresponding to the received search request, a presentation component for presenting the list of web resource links, and a database population component for receiving one or more user-selected and user-tagged web resource links from the list of web resource links and storing the one or more user-selected and user-tagged web resource links in association with a database.

In yet another embodiment, the present invention provides one or more computer-storage media having computer-useable instructions embodied thereon for performing a method of conducting a peer-to-peer Internet search. The method includes receiving one or more keywords input by a user and searching one or more client computing devices to determine if at least one web resource link stored in association therewith and associated with a web resource corresponds to the one or more keywords. At least one of the one or more client computing devices is a remote client computing device and the at least one remote client computing device is one of a trusted client computing device and an unknown client computing device. Upon determining that at least one web resource link corresponds to the received one or more keywords, the method further includes storing the at least one web resource link, generating a list of the web resource links corresponding to the one or more keywords, presenting the list to the user, receiving a user selection and user tagging of at least one of the one or more presented web resource links, and storing the one or more user-selected and user-tagged web resource links.

Having briefly described an overview of the present invention, an exemplary operating environment in which various aspects of the present invention may be implemented is now described. Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventor hereof recognizes that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, and any other medium that can be used to encode desired information and which can be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as the memory 112 or the I/O components 120. The presentation component(s) 116 present data indications to a user or other device. Exemplary presentation components include a display device, speaker, printing component, vibrating component, etc.

I/O ports 118 allow the computing device 100 to be logically coupled to other devices including the I/O components 120, some of which may be built in. Illustrative components include a microphone, joystick, game pad, satellite dish, scanner, printer, wireless device, etc.

Figure 2:
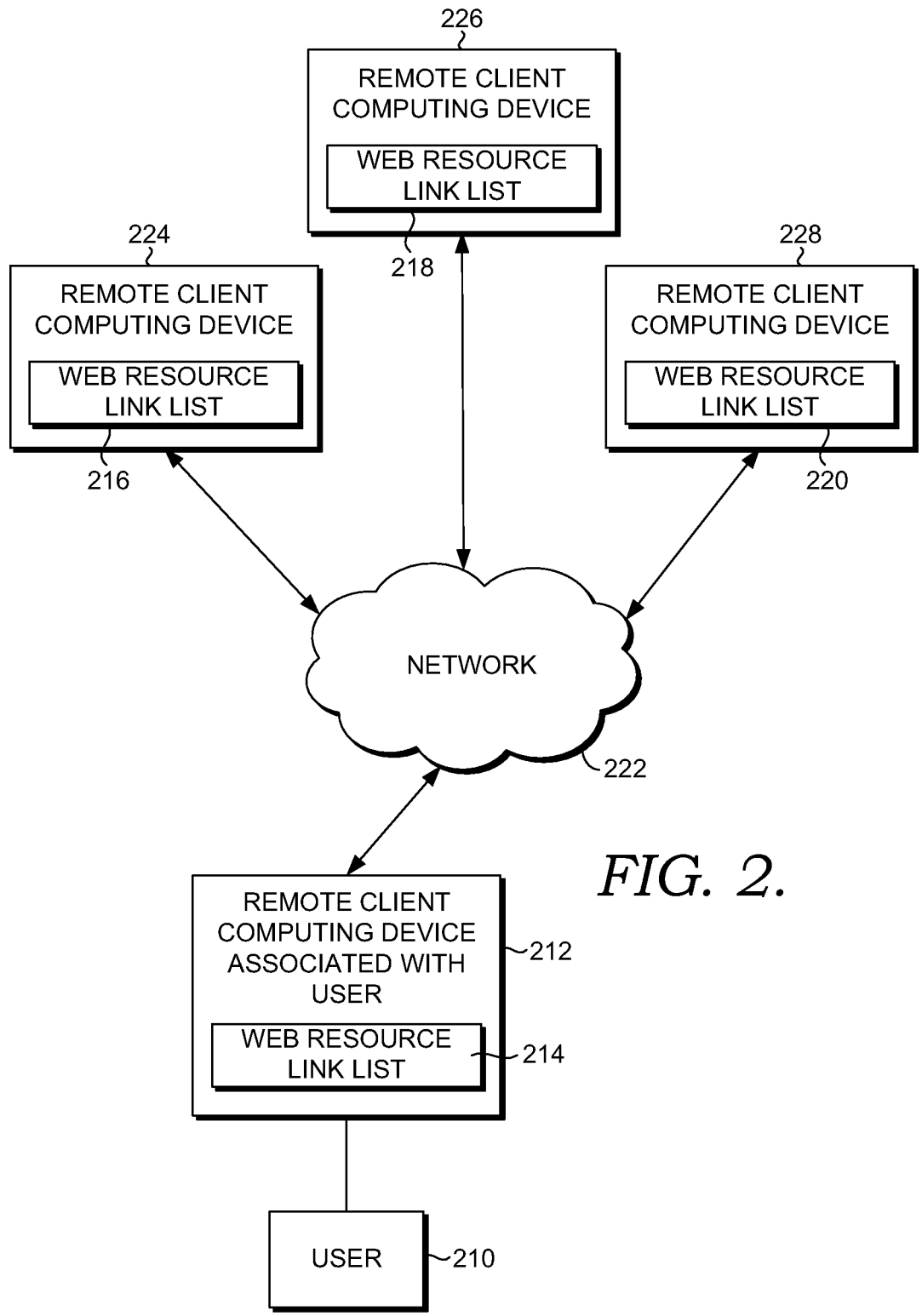
FIG. 2 is a schematic diagram showing an exemplary computing system architecture suitable for conducing peer-to-peer Internet searches, in accordance with an embodiment of the present invention.

Embodiments of the present invention provide systems and methods for conducting peer-to-peer (PTP) Internet searches utilizing tagged web resources. With reference now to FIG. 2, a schematic diagram is illustrated showing an exemplary computing system architecture 200 suitable for conducting peer-to-peer Internet searches, in accordance with an embodiment of the present invention. The computing system architecture 200 includes a client computing device 212 associated with a user 210, and a plurality of remote client computing devices 224, 226 and 228, all in communication with one another through a network 222. The client computing device 212 and the remote client computing devices 224, 226 and 228 form a PTP search community. The network 222 may include, without limitation, one or more wide area networks (WANs), one or more local area networks (LANs), one or more public networks, such as the Internet, and/or one or more private networks. Such networking environments are commonplace in offices, enterprise-wide computer networks, intranets and the Internet. Accordingly, the network 222 is not further described herein.

Each of the client computing device 212 and the remote client computing devices 224, 226 and 228 may be any type of computing device, for instance, computing device 100 of FIG. 1. By way of example only, each of the client computing device 212 and remote client computing devices 224, 226 and 228 may be a desktop personal computer, a laptop computer, a cellular telephone, a PDA, or any other client computing device. Further, each of the client computing device 212 and the remote client computing devices 224, 226 and 228 is associated with a web resource link list 214, 216, 218 and 220, respectively, having a list of user-selected and user-tagged web resource links. User selection and tagging of web resource links is more fully described below.

In embodiments, each remote client computing device 224, 226 and 228 includes a status of unknown or trusted. A status of unknown indicates that the user 210 is unfamiliar with the remote client computing device or has otherwise provided no indication of his or her level of trust thereof. A status of trusted indicates that the user 210 has identified the device as one that he or she trusts as providing useful web resource links in association with input search requests. The user 210 may change the status of any particular remote client computing device between unknown and trusted as desired. PTP searches conducted in accordance with embodiments of the present invention may be conducted of the user's local client computing device in addition to only trusted remote client computing devices, in addition to only unknown remote client computing device and/or in addition to any combination thereof, as specified by the user 210. Further, the remote client computing devices that will be searched in accordance with embodiments hereof may be limited by the number of router hops the device is from the client computing device associated with the user. The number of hops may be preprogrammed or specified by the user. Further, the remote client computing devices that will be searched in accordance with embodiments hereof may be limited to a specified number of computing devices. Any and all such variations are contemplated to be within the scope of embodiments hereof.

As more fully described below with reference to FIGS. 3, 4 and 5, the client computing device 212 is configured to receive a search request input by a user 210 and, in response thereto, configured to search a local web resource link list 214 associated with the client computing device 212 to identify web resource links that correspond to web resources satisfying the input search request. The client computing device 212 is further configured to search the web resource link lists 216, 218 and 220 associated with the remote client computing devices 224, 226 and 228, respectively, via network 222, to identify web resource links that correspond to web resources satisfying the input search request. The client computing 212 device is further configured to present any identified web resource links to the user 210.

Figure 3:
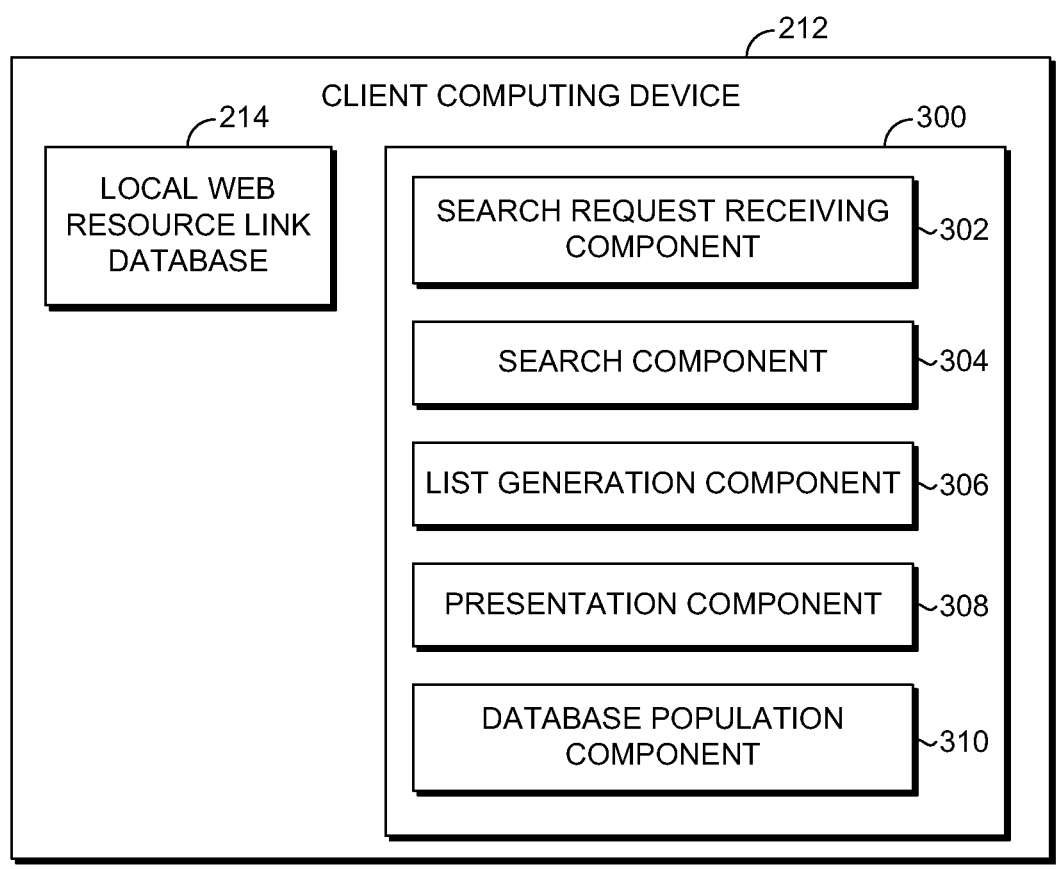
FIG. 3 is a schematic diagram showing an exemplary client computing device suitable for implementing embodiments of the present invention.

Turning now to FIG. 3, a schematic diagram is illustrated showing an exemplary client computing device 212 suitable for implementing embodiments of the present invention. The client computing device 212 includes a PTP search system 300 and a local web resource link database 214. The PTP search system 300 includes a search request receiving component 302, a search component 304, a web resource link list generation component 306, a presentation component 308 and a database population component 310. The PTP search system 300 may be implemented on the client computing device 212, as shown, or may be implemented on one or more of the remote client computing devices 224, 226 and 228 of FIG. 2 (not shown) and accessed through a web resource (website), e.g., utilizing network 222 of FIG. 2.

Returning to FIG. 3, the search request receiving component 302 is configured to receive a search request, for instance, comprised of one or more keywords, input by a user. The search component 304 is configured to search one or more client computing devices, local and/or remote, to identify web resource links associated with web resources corresponding to a received search request. Search algorithms for identifying web resources corresponding to (i.e., satisfying) input search requests are known to those of ordinary skill in the art and, accordingly, are not further described herein. Embodiments of the present invention are not limited by any particular search algorithm or algorithms. Upon determining that at least one web resource corresponds to the received search request, a web resource link corresponding to the identified web resource is stored in association with the PTP search system 300, for instance, in association with a data store (not shown).

The web resource list generation component 306 is configured to receive the identified and stored web resource links and generate a list thereof. The presentation component 308 is configured to receive the list generated by web resource list generation component 306 and present the list to the user, for instance, in association with a display device associated with the client computing device 212. The presented list of web resource links corresponding to the received search request may be organized by source, alphabetical order, number of hits each link receives, or any other characteristic. In embodiments, a source of the web resource links on the list may also be identified.

The database population component 310 allows a user, for instance user 210 of FIG. 2, to identify and select those presented web resource links that the user considers useful and store the useful links in association with a data store, for instance, local web resource link database 214. The database population component 310 is further configured to receive user-tagging of those web resource links the user desires to store in association with the web resource link database 214. Such tagging may be, for instance, keyword tagging by the user such that future search requests that include the tagging keyword will result in the user-tagged web resource link being presented to the user, for instance, utilizing presentation component 308. The database population component 310 may also be configured to allow the user to identify, tag, and/or store other useful web resource links in association with the web resource link database 214 that the user encounters while browsing the Internet through conventional means. Any and all such tagged web resource links, once stored in association with the web resource link database 214, may be searched upon receiving future search requests from the user.

Figure 4:
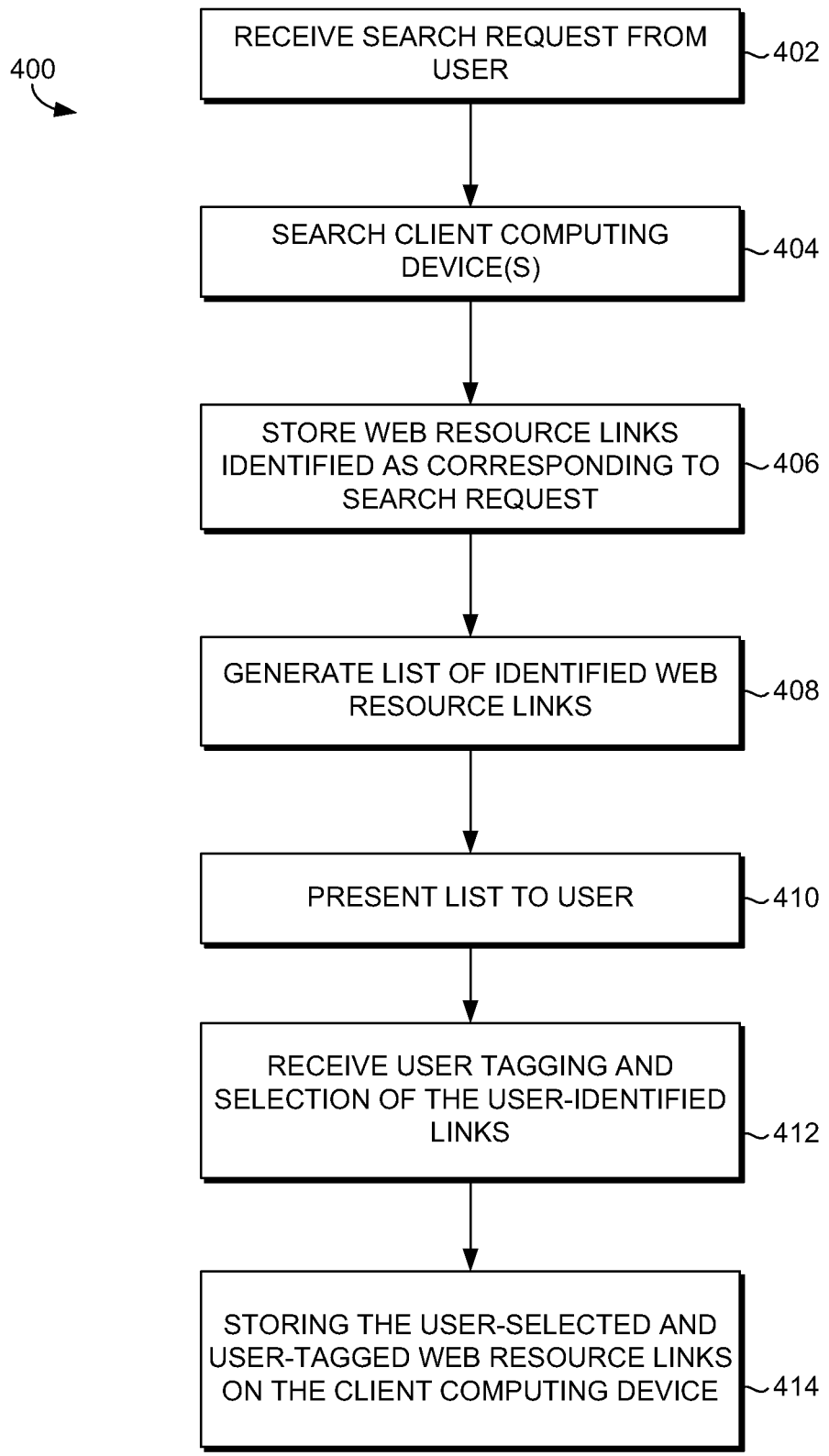
FIG. 4 is a flow diagram showing a method for conducting a peer-to-peer Internet search of web resources and adding a tag to a web resource, in accordance with an embodiment of the present invention.

With reference now to FIG. 4, is a flow diagram is illustrated showing a method for conducting a peer-to-peer Internet search of web resources and adding a tag to a web resource, in accordance with an embodiment of the present invention. At step 402, a search request input by a user is received, for instance, utilizing search request receiving component 302 of FIG. 3. At step 404, one or more client computing devices is searched, for instance, utilizing search component 304 of FIG. 3, to determine if at least one web resource link stored in association with the searched device(s) is associated with a web resource that corresponds to (i.e., satisfies) the received search request. In one embodiment, only client computing devices associated with user are searched. In other embodiments, one or more remote client computing devices may also be searched. Remote client computing devices that are searched may be limited by the number of router hops necessary to reach the device(s), a maximum number specified for devices to be searched, or any other desirable means. Any and all such variations are contemplated to be within the scope of embodiments of the present invention.

Upon determining that at least one web resource associated with the identified web resource links corresponds to the received search request, the at least one web resource link is stored, as indicated at step 406.

At step 408, a list is generated of the identified web resource links from the searched client computing device(s) corresponding to the search request entered by the user, for instance, utilizing the web resource list generation component 306 of FIG. 3. The list is then presented to the user at step 410, for instance, in association with a display device associated with the client computing device 212 of FIG. 2. In embodiments, the list may be presented to the user utilizing presentation component 308 of FIG. 3.

Upon the user determining that one or more web resource links presented at step 410 are useful or otherwise desirable, the user may select and tag (for instance, with one or more keywords) the desirable web resource(s). The user-selected and user-tagged web resource link(s) associated with the desirable web resource(s) are received at step 412. At step 414, the user-selected and user-tagged web resource links are locally stored, for instance, in association with local web resource link database 214 of the client computing device 212 of FIG. 2. In embodiments, the user-selected and user-tagged web resource links may be added to the local web resource link database of the client computing device utilizing database population component 310 of FIG. 3. The stored website links are subsequently available to be searched upon input of subsequent search requests input by the user, or by other users having client computing devices in the same community as the user, for instance, via network 222 of FIG. 2. If the user does not desire to tag any of the presented web resources, he or she may discard the presented links as irrelevant, thus ending the search cycle.

Figure 5:
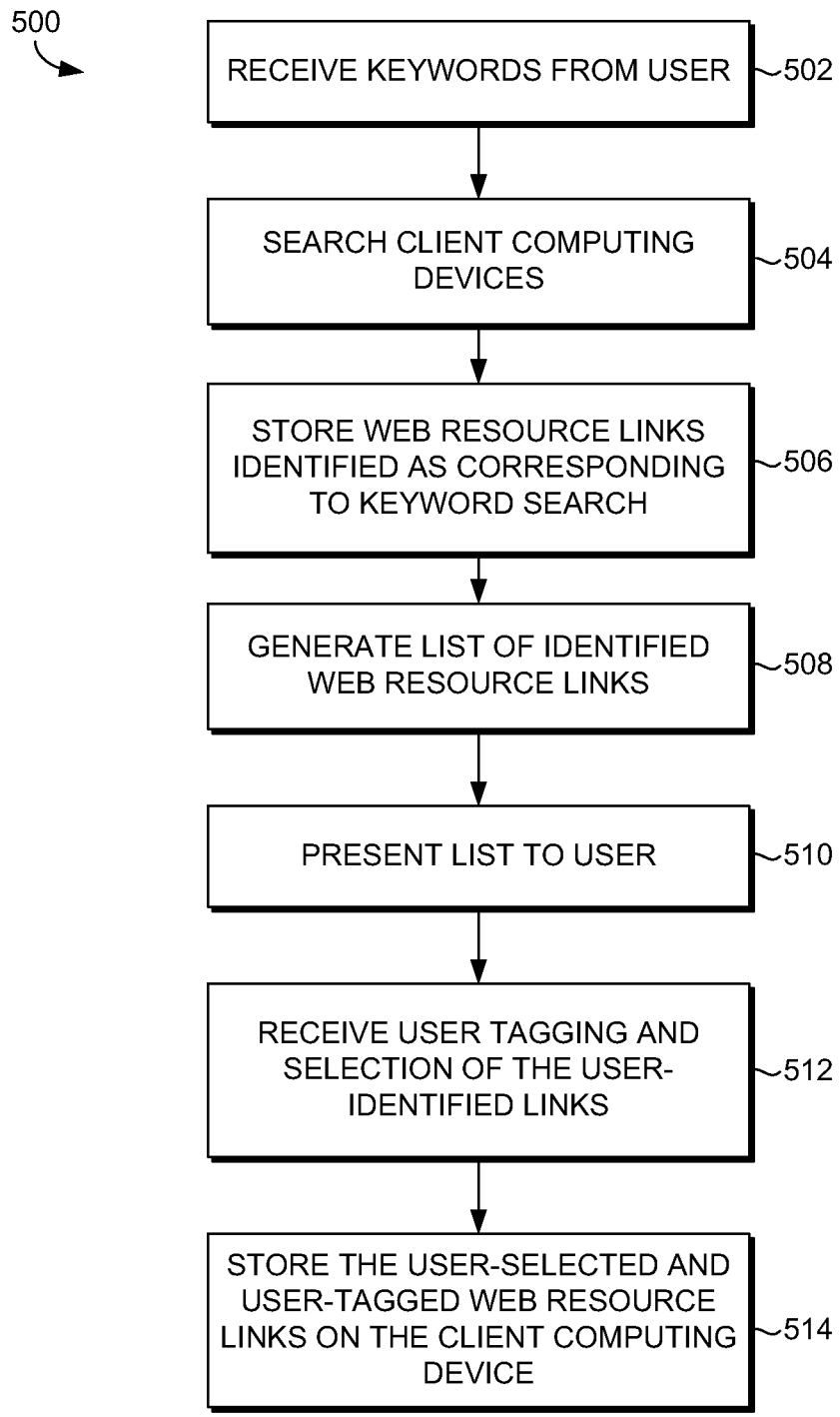
FIG. 5 is a flow diagram showing a method for conducting a peer-to-peer Internet search of web resources and adding a tag to a web resource, in accordance with embodiments of the present invention.

Turning now to FIG. 5, a flow diagram is illustrated showing a method 500 for conducting a peer-to-peer Internet search of web resources and adding a tag to a web resource, in accordance with embodiments of the present invention. At step 502, one or more keywords input by a user are received, for instance, utilizing search request receiving component 302 of FIG. 3. At step 504, one or more client devices, including at least one trusted or unknown remote client computing device, is searched to determine if at least one web resource link stored in association therewith and associated with a web resource corresponds to the received keyword(s). Upon determining that at least one web resource link associated with a web resource corresponds to the received keyword(s), the web resource link(s) are stored, as indicated at step 506. At step 508, a list of web resource links associated with web resources corresponding to the keyword(s) is generated, for instance, utilizing web resource list generation component 306 of FIG. 3. The list is then presented to the user, for instance, utilizing presentation component 308 of FIG. 3, as indicated at step 510.

At step 512, user selection of one or more of the presented web resource links is received, as is user tagging (for instance, keyword tagging) of the one or more presented web-based links. The user-selected and user-tagged web resource link(s) are subsequently stored, e.g., in association with local web resource link database 214 of FIG. 2, as indicated at step 514. If the user does not desire to tag any of the presented web resources, he or she may discard the presented links as irrelevant, thus ending the search cycle.

As can be understood, embodiments of the present invention relate to systems and methods for conducting peer-to-peer (PTP) Internet searches utilizing tagged web resources, that is, web resources that the local user and/or a user at an associated remote computing device has tagged as evidence of a desire to have that resource as part of the PTP search community of resources. Using the systems and methods described herein, a user's search query is received and local and/or remote client computers associated with the user are searched directly for stored web resource links corresponding to the user's search query. Links to web resources that are identified by the search as corresponding to (i.e., satisfying) the user's search query are presented to the user. The user may then review the presented web resource links and determine if he or she would like to tag the web resource and add it to his or her local list of resources as part of the foundation for future searches.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and is within the scope of the claims.

Having thus described the invention, what is claimed is:

1. A computer-implemented method for conducting a peer-to-peer Internet search, comprising:
   receiving a search request input at a first computing device, wherein the first computing device:
   (1) searches:
       a) a first user-generated web resource link list stored locally on the first computing device for a tagged first web resource link associated with a first web resource corresponding to the received search request, and
       b) a second user-generated web resource link list stored locally on a remote client computing device that is different from the first computing device, for a tagged second web resource associated with a second web resource corresponding to the received search request;

(2) stores the tagged first web resource link and the tagged second web resource link in association with the first computing device;

(3) generates and presents a list of at least the tagged first web resource link and the tagged second web resource link on the first computing device;

(4) receives a selection and a user-tagging of at least the tagged second web resource link; and (5) stores the selected and user-tagged second web resource link in association with the first user-generated web resource link list on the first computing device.

2. The computer-implemented method of claim 1, wherein the remote client computing device is associated with a first status of unknown.

3. The computer-implemented method of claim 2, further comprising receiving user input to change the first status of the remote client computing device to a second status of trusted.

4. The computer-implemented method of claim 1, wherein the remote client computing device is within a specified number of hops from the first computing device.

5. The computer-implemented method of claim 1, wherein generating the list comprises identifying a source of each of the tagged first and second web resource links.

6. The computer-implemented method of claim 1, further comprising receiving a selection and a tag of a web resource link associated with a web resource encountered while a user is browsing the Internet.

7. A computing system comprising a first computing device for performing a method for conducting a peer-to-peer Internet search, the computing system comprising a processor coupled to a computer-readable medium, the computer-readable medium having stored thereon a plurality of computer software components executable by the processor, the computer software components comprising:

a search request receiving component that receives a search request from a user associated with the first computing device;

a search component that searches
(1) a first user-generated web resource link list stored locally on the first computing device for a tagged first web resource link associated with a first web resource corresponding to the received search request, and
(2) a second user-generated web resource link list stored locally on a remote client computing device that is different from the first computing device, for a tagged second web resource link associated with a second web resource corresponding to the received search request;

a list generation component that generates a list comprising the tagged first web resource link and the tagged second web resource link;

a presentation component that presents the list on the first computing device; and a database population component that receives from the user a selection and a tag of the tagged second web resource link and stores the selected and tagged second web resource link in association with the first user-generated web resource link list associated with the first computing device.

8. The computing system of claim 7, wherein the remote client computing device different from the first computing device has a first status of trusted.

9. The computing system of claim 8, further comprising a client trust status component that receives user input to change the first status of the remote client computing device different from the first computing device to a second status of unknown.

10. The computing system of claim 7, wherein the presentation component also presents the first and second web resources associated with the tagged first and second web resource links respectively.

11. The computing system of claim 7, wherein the database population component also receives one or more additional user-selected and user-tagged web resource links corresponding to web resources selected by the user upon browsing the Internet and adds the one or more additional user-selected and user-tagged web resource links to the first user-generated web resource link list.

12. One or more computer storage devices having computer-useable instructions embodied thereon for performing a method for conducting a peer-to-peer Internet search at a first computing device, comprising:

receiving one or more keywords input at the first computing device, wherein the first computing device:
(1) searches
a) a first user-generated web resource link list stored locally on the first computing device for a tagged first web resource link having a tag that matches at least one of the one or more keywords, the tagged first web resource link being associated with a first web resource, and
b) a second user-generated web resource link list stored locally on a remote client computing device that is different from the first computing device, for a tagged second web resource link having a tag that matches at least one of the one or more keywords, the tagged second web resource link associated with a second web resource, wherein the remote client computing device has a status of trusted client computing device;
(2) stores the tagged first and second web resource links in association with the first computing device;
(3) generates and presents a list of at least the tagged first web resource link and the tagged second web resource link on the first computing device;
(4) receives a selection and a user-tagging of at least the tagged second web resource link; and
(5) stores the selected and user-tagged second web resource link in association with the first user-generated web resource link list on the first computing device.

13. The one or more computer storage devices of claim 12, wherein the method further comprises receiving input to change the status of the remote client computing device to a status of unknown client computing device.

14. The one or more computer storage devices of claim 13, wherein the remote client computing device having the status of unknown client computing device is a maximum of a specified number of hops away from the first computing device.

15. The one or more computer storage devices of claim 12, wherein presenting the list on the first computing device comprises identifying a source of each of the tagged first and second web resource links.

16. The one or more computer storage devices of claim 12, wherein the method further comprises receiving a selection and a tagging of a web resource link associated with a web resource encountered while a user is browsing the Internet.

* * * * *